(12) United States Patent
Goddard

(10) Patent No.: US 9,494,443 B2
(45) Date of Patent: *Nov. 15, 2016

(54) DYNAMICALLY VARIED MAP LABELING

(71) Applicant: TeleCommunication Systems, Inc., Annapolis, MD (US)

(72) Inventor: Mark Goddard, Rancho Santa Margarita, CA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,046

(22) Filed: Feb. 24, 2016

(65) Prior Publication Data

US 2016/0169700 A1    Jun. 16, 2016

Related U.S. Application Data

(63) Continuation of application No. 14/557,843, filed on Dec. 2, 2014, now Pat. No. 9,304,012, which is a continuation of application No. 13/911,553, filed on Jun. 6, 2013, now Pat. No. 8,930,139.

(60) Provisional application No. 61/662,582, filed on Jun. 21, 2012.

(51) Int. Cl.
*G01C 21/36* (2006.01)
*G01C 21/32* (2006.01)

(52) U.S. Cl.
CPC ........... *G01C 21/3673* (2013.01); *G01C 21/32* (2013.01)

(58) Field of Classification Search
CPC ................ G01C 21/3673; G01C 21/32
See application file for complete search history.

(56) References Cited

U.S. PATENT DOCUMENTS

| | | | |
|---|---|---|---|
| 8,078,641 B2 * | 12/2011 | Mao et al. | G06F 17/30241 707/796 |
| 2009/0181650 A1 * | 7/2009 | Dicke | G01C 21/32 455/414.1 |

* cited by examiner

*Primary Examiner* — Russell Frejd
(74) *Attorney, Agent, or Firm* — Tarolli, Sundheim, Covell & Tummino LLP

(57) ABSTRACT

Methods for dynamically varying label density and label placement on a map display used in mapping and/or navigation solutions. Label density and label placement on a map display are adjusted dynamically based on: a function class of a road being navigated, a function class of a road to be navigated following an upcoming maneuver, a distance to an upcoming maneuver, and/or a speed a device receiving mapping/navigation services is travelling.

17 Claims, 5 Drawing Sheets

DYNAMICALLY VARIED MAP LABELING

This application is a continuation of U.S. patent application Ser. No. 14/557,843, filed on Dec. 2, 2014, entitled "Dynamically Varied Map Labeling" now U.S. Pat. No. 9,304,012; which is a continuation of U.S. patent application Ser. No. 13/911,553, filed on Jun. 6, 2013, entitled "Dynamically Varied Map Labeling", now U.S. Pat. No. 8,930,139; which claims priority from U.S. Provisional No. 61/662,582, filed Jun. 21, 2012, entitled "Dynamically Varied Map Labeling", the entirety of all three of which are expressly incorporated herein by reference.

BACKGROUND OF THE INVENTION

1. Field of the Invention

This invention relates generally to mapping and navigation, and in particular to location based services (LBS).

2. Background of the Related Art

Conventional navigation solutions obtain a geographic location of a client/user device (e.g. a vehicle, a mobile phone, etc.) and provide route instructions and navigation services (e.g. route calculation, point of interest (POI) lookup, etc.) accordingly. Route instructions provided by a navigation solution indicate a set of maneuvers to be performed at specified locations. A maneuver describes an action that is required to leave one street segment and enter a next street segment along a navigated route.

Conventional navigation solutions exhibit an electronic map display while providing navigation services, to enable users to orient themselves in the real world.

FIG. 3 depicts an illustrative example of a conventional electronic map display.

As depicted in FIG. 3, an electronic map display 300 typically depicts a geographic location of a device 310 and a direction of travel.

Current solutions for providing a map display 300 are not optimal, because they either label roads in a haphazard manner or restrict the roads for which road labels 312*a*-312*e* may be shown on a map display 300, to roads that intersect a current route 314. Current solutions also often limit the number of road labels 312*a*-312*e* that may be shown on a map display 300 based on map zoom level.

In particular, each zoom level on a conventional map display is assigned a static label density, indicating a maximum number of road labels allowed on the map display at that zoom level. A conventional map display always contains a number of road labels that is less than or equal to a static label density (i.e. a maximum number of road labels) assigned to a current zoom level.

Some existing navigation solutions adjust map zoom level dynamically, in accordance with a speed a device receiving navigation services is travelling. In this case, the number of road labels presented on a map display increases or decreases as is required to adhere to a static label density defined at each zoom level.

FIGS. 4A and 4B depict an illustrative example of road labels on a map display at different zoom levels.

As depicted in FIG. 4A, a map display with a high zoom level 400 is typically limited to fewer road labels than is a map display with a low zoom level 420, shown in FIG. 4B.

For example, a map display with a low zoom level 420, e.g. zoom level 0, may be limited to ≤12 road labels 410*a*-410*i* (FIG. 4B), whereas a map display with a high zoom level 400, e.g. zoom level 10, may be limited to ≤3 road labels 430*a*, 430*b* (FIG. 4A).

A static label density may cause a map display to look cluttered, or may influence a navigation solution to exhibit only minimal information on a map display, in attempts to avoid clutter. Due to use of a static label density, conventional navigation solutions are forced to present either an uncluttered map display with little information (e.g. road names, city names, etc.) or a cluttered map display with more information.

SUMMARY

The present invention provides methods for dynamically varying the label density (i.e. number of labels) and placement of labels on a map display used in mapping and/or navigation solutions. In accordance with the principles of the present invention, label density and label placement on a map display is adjusted dynamically based on: a function class of a road being navigated, a function class of a road to be navigated following an upcoming maneuver, a distance to an upcoming maneuver, and/or a speed a device receiving mapping/navigation services is travelling.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

Figure 1:
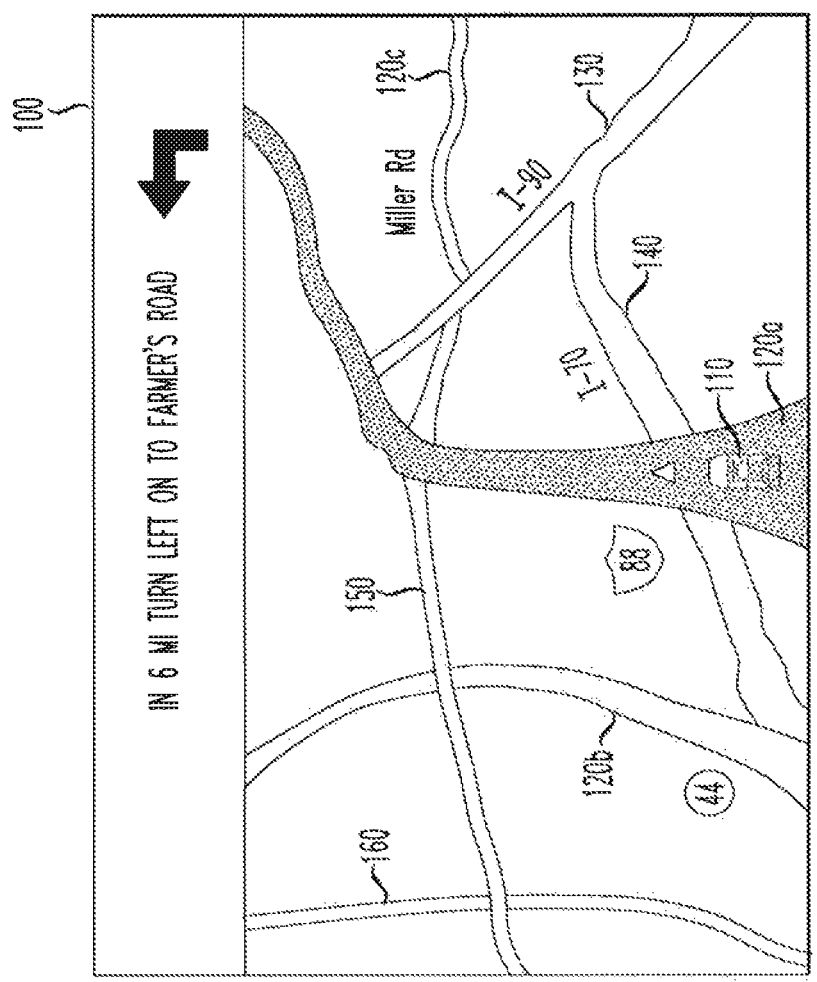
FIG. 1 depicts an illustrative example of a map display that displays road labels based on a function class of a road being navigated, in accordance with the principles of the present invention.

The present invention dynamically varies the label density (i.e. the number of labels) and placement of labels on a map display used in mapping and/or navigation solutions, to better respond to a user's needs.

The present inventor has appreciated that current solutions for providing a map display used in mapping and/or navigation solutions, lack flexibility. In particular, current solutions restrict the roads for which road labels may be shown on a map display, to roads that intersect a navigated route (i.e. a route being currently navigated). Moreover, current mapping and navigation solutions select a static road label density (i.e. a fixed maximum number of road labels) for a map display based on map zoom level. Therefore, only a predetermined number of road labels affiliated with a current zoom level may be presented on a map display at any given time. Such a limitation forces navigation solutions to display either an uncluttered map display with little information, or a cluttered map display with more information.

The present invention dynamically varies the density and placement of road labels on a map display based on: a function class of a road being navigated, a function class of a road to be navigated following an upcoming maneuver (i.e. an action required to leave one street segment and enter a next street segment along a navigated route), a distance to an upcoming maneuver, and/or a speed a device receiving navigation services is travelling.

Some navigable map database suppliers (e.g. NAVTEQ) categorize roadways into function classes based on road function. For instance, roadways categorized as function class 1 roads typically include controlled-access highways connecting major cities. Roadways typically classified as function class 2 roads include highways that connect major cities to smaller cities, at a mobility level that is lower than that of function class 1 roads. Function class 3 roads typically include arterial roads, which provide major routes between minor cities and towns. Roadways typically classified as function class 4 roads include local collector roads that collect traffic from local roads and distribute traffic to arterial roads. Moreover, roadways typically classified as function class 5 roads include local roads with low speed and low traffic volume.

In accordance with the principles of the present invention, a first method for dynamically varying the density and placement of road labels on a map display includes displaying road labels for only those roads that are of a same function class or of a more significant function class as a road that is currently being navigated.

FIG. 1 depicts an illustrative example of a map display that displays road labels based on a function class of a road being navigated, in accordance with the principles of the present invention.

For example, as depicted in FIG. 1, when a device 110 is travelling on an arterial road 120a (a function class 3 road 120a-120c), road labels are presented on a map display 100 for arterial roads (function class 3 roads 120a-120c) and highways (function class 1 130 and function class 2 roads 140), and road labels are not presented on the map display 100 for local collector roads and local roads (function class 4 150 and function class 5 roads 160), In another method for dynamically varying the density and placement of road labels on a map display, road labels are displayed for only those roads that are of a same function class or of a more significant function class as both a road being currently navigated and a road that is to be navigated following an upcoming maneuver.

Figure 2:
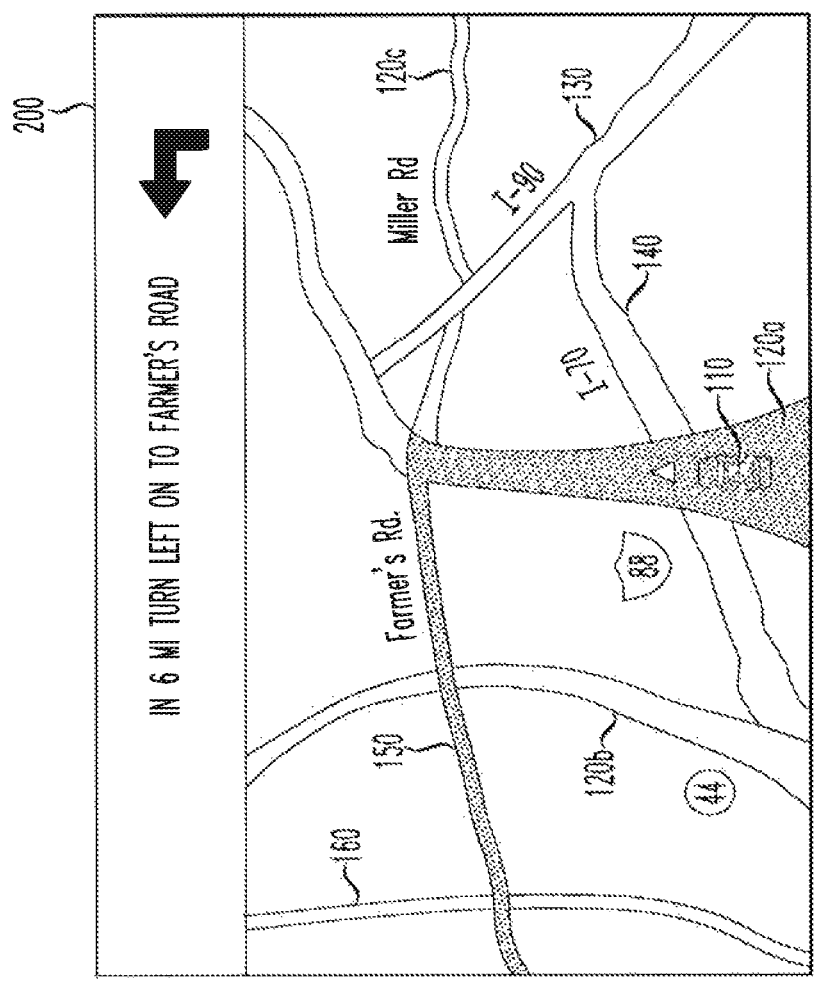
FIG. 2 depicts an illustrative example of a map display that displays road labels based on a function class of a road being navigated and a function class of a road to be navigated following an upcoming maneuver, in accordance with the principles of the present invention.
Figure 3:
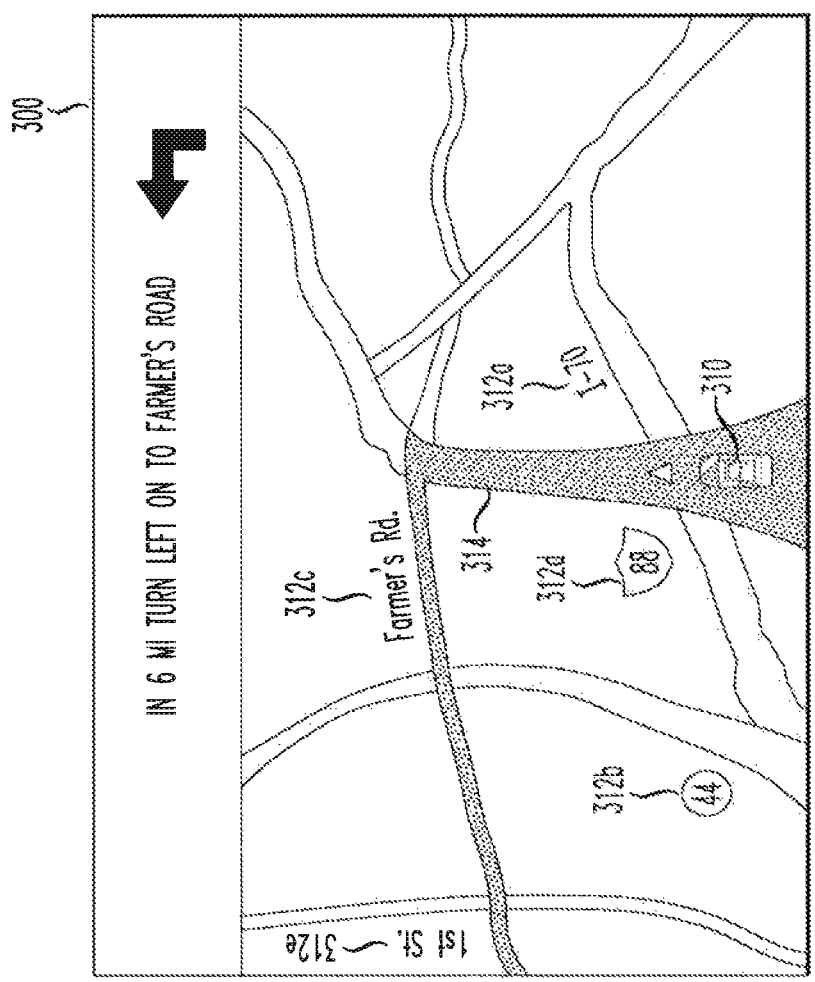
FIG. 3 depicts an illustrative example of a conventional electronic map display.
Figure 4A:
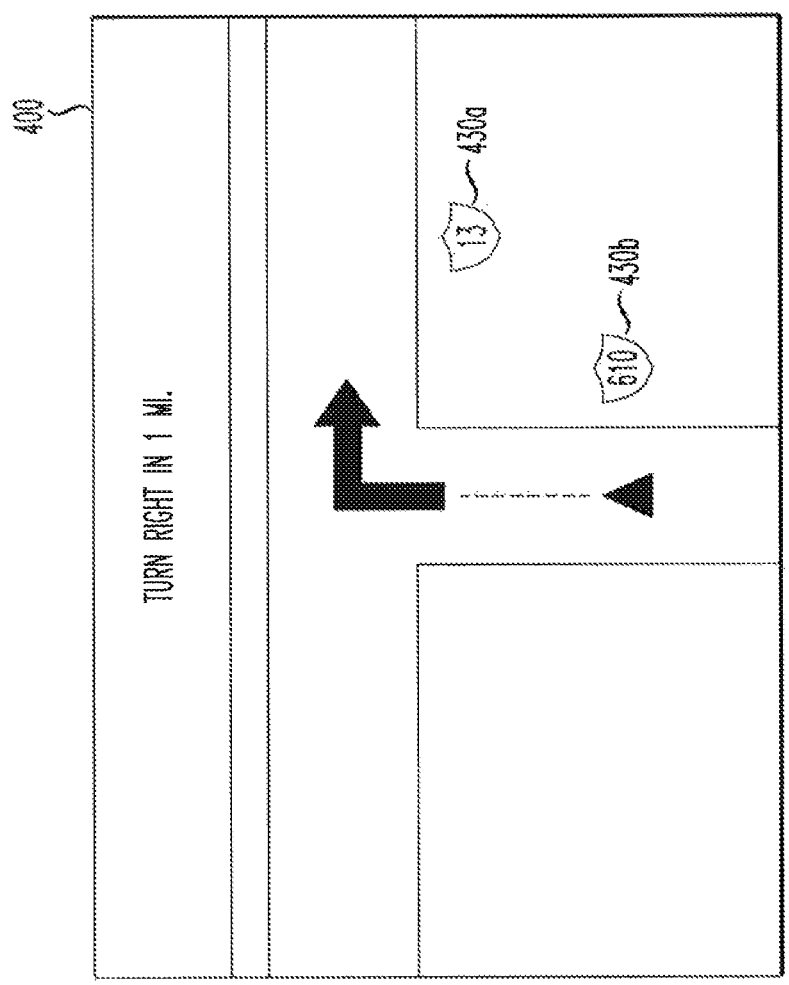
FIGS. 4A and 4B depict an illustrative example of road labels presented on a map display at different zoom levels.
Figure 4B:
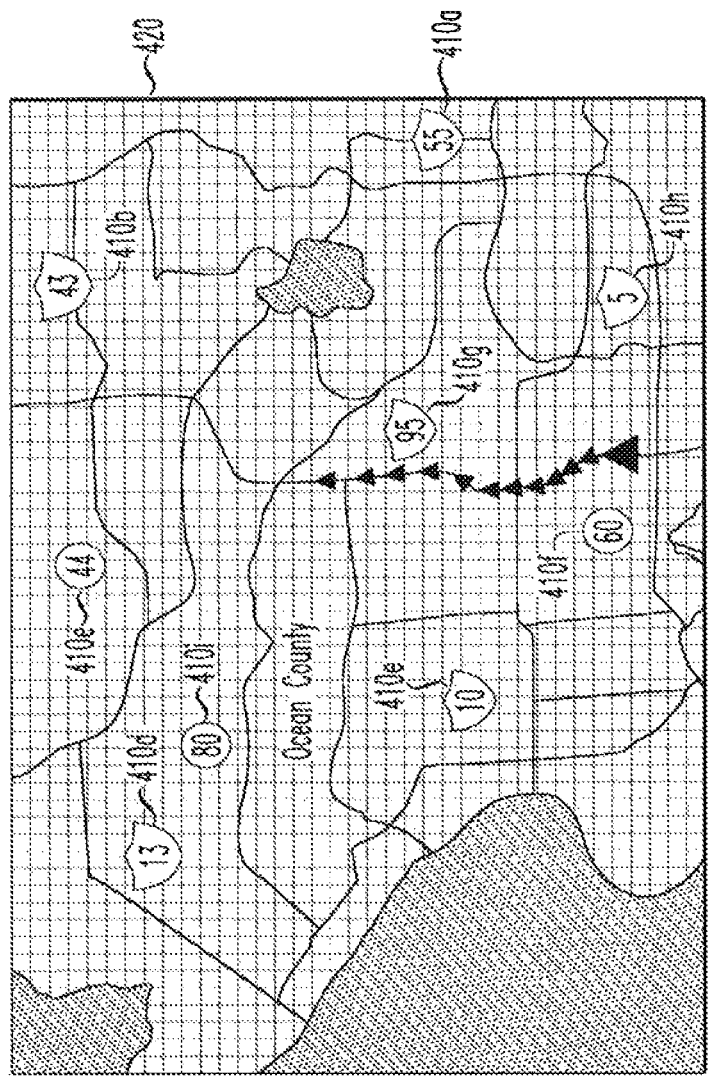

FIG. 2 depicts an illustrative example of a map display that displays road labels based on a function class of a road being navigated and a function class of a road to be navigated following an upcoming maneuver, in accordance with the principles of the present invention.

As depicted in FIG. 2, when a device 110 is travelling on an arterial road 120a (a function class 3 road 120a-120c), and following an upcoming maneuver the device 110 is to be travelling on a local collector road (a function class 4 road 150), then road labels are shown on a map display 200 for highways (function class 1 130 and function class 2 roads 140), arterial roads (function class 3 roads 120a-120c) and local collector roads (function class 4 roads 150), and road labels are not shown on the map display 200 for local roads (function class 5 roads 160).

In another method for dynamically varying the density and placement of road labels on a map display, a map display exhibits road labels for only a predetermined number of roads preceding an upcoming maneuver, that are of a same function class or of a more significant function class as a road being currently navigated and/or a road to be navigated following an upcoming maneuver.

Moreover, in yet another method, a map display includes road labels for only those roads that are within a predetermined distance threshold of an upcoming maneuver, and of a same function class or of a more significant function class as a road being currently navigated and/or a road to be navigated following an upcoming maneuver.

In accordance with the principles of the present invention, another method for dynamically varying road label density and placement of road labels on a map display comprises only displaying road labels for roads that are intersecting a current route. This is a conventional method for displaying road labels on a map display (as shown in FIG. 1).

Another method for dynamically varying road label density and road label placement on a map display includes only exhibiting road labels for roads intersecting a current route that are also of a same function class or of a more significant function class as a road being currently navigated.

Moreover, in yet another method for dynamically varying the density and placement of road labels on a map display, a map display only exhibits road labels for roads intersecting a current route, that are also of a same function class or of a more significant function class as both a road being currently navigated and a road that is to be navigated following an upcoming maneuver.

In another method for dynamically varying the density and placement of road labels on a map display, a map display only exhibits road labels for a predetermined number of roads preceding an upcoming maneuver, that are both intersecting a current route, and of a same function class or of a more significant function class as a road being currently navigated and/or a road that is to be navigated following an upcoming maneuver.

Moreover, another method for dynamically varying road label density and placement of road labels on a map display, includes only exhibiting road labels for roads intersecting a current route, that are within a predetermined distance threshold of an upcoming maneuver, and also of a same function class or of a more significant function class as a road being currently navigated and/or a road to be navigated following an upcoming maneuver.

In yet another method, a map display varies the function class of roads for which road labels are exhibited on a map display based on a current speed of a device receiving navigation services. For example, when a device receiving navigation services exceeds a predetermined speed of travel, road labels for function class 4 and 5 roads are removed from a map display. Likewise, road labels for function class 4 and 5 roads are again added to the map display when the device falls back below the predetermined speed of travel.

The present invention has particular applicability to navigation and mapping solutions and products. Function classes described herein are exemplary. The present invention may be applied to any form of hierarchical road classification system.

While the invention has been described with reference to the exemplary embodiments thereof, those skilled in the art will be able to make various modifications to the described embodiments of the invention without departing from the true spirit and scope of the invention.

What is claimed is:

1. A method for dynamically varying a density of road labels displayed on a navigational map on a mobile phone, comprising:
    dynamically varying a density of road labels displayed on a navigational map on a mobile phone, said density of road labels being selected for display being varied in density based on:
        a function class of a current road being navigated by said mobile phone, and only roads intersecting said current road along a navigated route following an upcoming maneuver.

2. The method for dynamically varying a density of road labels displayed on a navigational map on a mobile phone according to claim 1, wherein said density of road labels being selected for display being varied in density further based on:
   a distance to said upcoming maneuver.

3. The method for dynamically varying a density of road labels displayed on a navigational map on a mobile phone according to claim 1, wherein said density of road labels being selected for display being varied in density for display further based on:
   a speed said user device is travelling.

4. The method for dynamically varying a density of road labels displayed on a navigational map on a mobile phone according to claim 1, wherein said density of road labels being selected for display being varied in density for display further based on:
   a distance to said upcoming maneuver; and
   a speed that said mobile device is travelling along a navigated route.

5. The method for dynamically varying a density of road labels displayed on a navigational map on a mobile phone according to claim 1, wherein:
   said upcoming maneuver is a navigated prompt for said mobile phone to navigate off said current road and enter a next road along a navigated route.

6. The method for dynamically varying a density of road labels displayed on a navigational map on a mobile phone according to claim 1, wherein:
   said road labels are displayed on said navigational map for only a predetermined number of roads preceding said upcoming maneuver.

7. The method for dynamically varying a density of road labels displayed on a navigational map on a mobile phone according to claim 1, wherein:
   said road labels are displayed on said navigational map only for roads located within a predetermined distance of said upcoming maneuver.

8. A method for dynamically varying a density of road labels displayed on a navigational map on a mobile phone, comprising:
   dynamically varying a density of road labels displayed on a navigational map on a mobile phone, said density of road labels being selected for display being varied in density based on:
      a predetermined number of roads preceding an upcoming maneuver, that are both intersecting a current route, and of a same function class or a more significant function class as a road being currently navigated.

9. The method for dynamically varying a density of road labels displayed on a navigational map on a mobile phone according to claim 8, wherein said density of road labels being selected for display is varied further based on:
   a speed said mobile phone is travelling.

10. The method for dynamically varying a density of road labels displayed on a navigational map on a mobile phone according to claim 8, wherein:
    said upcoming maneuver is an action for said mobile phone to navigate off said current road and enter a next road along a navigated route.

11. The method for dynamically varying a density of road labels displayed on a navigational map on a mobile phone according to claim 8, wherein:
    only road labels for a predetermined number of roads preceding said upcoming maneuver are displayed on said navigational map.

12. The method for dynamically varying a density of road labels displayed on a navigational map on a mobile phone according to claim 8, wherein:
    only road labels for roads within a predetermined distance of said upcoming maneuver are displayed on said navigational map.

13. A method for dynamically varying a density of road labels displayed on a navigational map on a mobile phone, comprising:
    dynamically varying a density of road labels displayed on a navigational map on a mobile phone, said density of road labels being selected for display being varied in density based on:
       a predetermined number of roads preceding an upcoming maneuver, that are both intersecting a current route, and of a same function class or a more significant function class as a road that is to be navigated following said upcoming maneuver.

14. The method for dynamically varying a density of road labels displayed on a navigational map on a mobile phone according to claim 13, wherein said density of road labels being selected for display is varied further based on:
    a speed said mobile phone is travelling.

15. The method for dynamically varying a density of road labels displayed on a navigational map on a mobile phone according to claim 13, wherein:
    said upcoming maneuver is an action for said mobile phone to navigate off said current road and enter a next road along a navigated route.

16. The method for dynamically varying a density of road labels displayed on a navigational map on a mobile phone according to claim 13, wherein:
    only road labels for a predetermined number of roads preceding said upcoming maneuver are displayed on said navigational map.

17. The method for dynamically varying a density of road labels displayed on a navigational map on a mobile phone according to claim 13, wherein:
    only road labels for roads within a predetermined distance of said upcoming maneuver are displayed on said navigational map.

\* \* \* \* \*